(12) United States Patent
Kober et al.

(10) Patent No.: US 7,517,279 B2
(45) Date of Patent: Apr. 14, 2009

(54) VEHICLE VENTILATING DEVICE

(75) Inventors: Steve Kober, Schreiersgrund (DE); Marco Braun, Lug (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 10/542,475

(22) PCT Filed: Jan. 27, 2004

(86) PCT No.: PCT/EP2004/000678

§ 371 (c)(1),
(2), (4) Date: May 22, 2006

(87) PCT Pub. No.: WO2004/067302

PCT Pub. Date: Aug. 12, 2004

(65) Prior Publication Data

US 2006/0270332 A1    Nov. 30, 2006

(30) Foreign Application Priority Data

Jan. 27, 2003    (DE) .................. 103 03 114

(51) Int. Cl.
*B60H 1/34*    (2006.01)
(52) U.S. Cl. ...................... 454/155; 454/152

(58) Field of Classification Search ............... 454/152, 454/155
See application file for complete search history.

(56) References Cited

U.S. PATENT DOCUMENTS

2002/0050530 A1*    5/2002    Stefano et al. ............. 236/49.3

FOREIGN PATENT DOCUMENTS

| DE | 1909519 | 9/1970 |
|---|---|---|
| DE | 297 16 410 | 12/1997 |
| FR | 2728529 | 6/1996 |
| FR | 2728530 | 6/1996 |
| FR | 2802859 | 6/2001 |
| WO | WO 00/25164 | 5/2000 |

OTHER PUBLICATIONS

PCT/EP04/00678 (Search Report), Aug. 11, 2005, Faurecia Innenram Sys.

* cited by examiner

*Primary Examiner*—Steven B McAllister
*Assistant Examiner*—Samantha A Miller
(74) *Attorney, Agent, or Firm*—Matthew B. Dernier, Esq.; Gibson & Dernier LLP

(57) ABSTRACT

The invention concerns an air outlet for a vehicle with an actuator for an air outflow, with the actuator featuring a temperature-inducible deformation effect, and means to trigger the deformation effect.

19 Claims, 4 Drawing Sheets

VEHICLE VENTILATING DEVICE

BACKGROUND

The present invention concerns an air diffuser for a vehicle, in particular for ventilation, heating and/or air conditioning of the passenger compartment.

Air diffuser are known for use in vehicles of various kinds. They allow a entry of fresh air, heated and/or colled air into a vehicle interior. Usually, anticipated air diffusers have an air outlet element with passage ways and which is rotatable around one or several axes. By orienting the air outlet element the direction of the air stream can be selected.

From patent DE 19721831A1 an air diffuser for the interior of a vehicle is known where the air outlet element features a partial area for a diffuse air exit and a partial area for an unrestricted air exit over a larger area, and where the manner of the air exit can be selected by turning the air exit element.

From patent DE 4338099C2 is also known an instrument panel with a large-surface perforated air exit surface covering an airduct on one side, for diffuse air distribution.

Here the large-surface perforated air exit area forms the top side of the instrument panel facing the windshield. The air exit area is connected to an air distributor box which has a perforated ventilation damper for controling the airstream. Additional air supply devices for the vehicle interior which allow diffuse ventilation, are for instance known from patents DE 3908541C2, DE 1530615 and DE 1909519.

Anticipated air outlets are generally adjusted manually. There are however air outlets in the luxury class that are driven by an actuator.

From patent DE 3717676A1 a vehicle air conditioning unit is known which has a bimetallic tab which effects a commutation at a channel branching, depending on the airstream temperature, the airstream intensity or according to a time function.

A disadvantage of anticipated air outlets for producing a diffuse flow field is the flow field is not adequately diffuse, i.e., that it is still distinguishable as a directed flow field and/or that the constructive expenditure for obtaining the diffuse flow field is relatively high.

Furthermore it is also known from the state of the art, to provide a vehicle seat with ventilation. In the so-called "climate seat" of the BMW 7 vehicles multistage fans are imbedded in the upholstery of seat and back which circulate air from the vehicle interior through the seat upholstery. By means of balance control heat distribution between the seat are and the seatback can be adjusted individually. Here again it is disadvantageous that the constructive expenditure for making such a ventilated seat is relatively high.

The invention is therefore based on the objective to create an improved air outlet for a vehicle, as well an an improved instrument panel, a headliner and interior covering with a ventilating function, as well as a vehicle seat with integrated ventilation.

The objective the invention is based on is being solved with the characteristics of the individual patent claims. According to invention an actuator for the air outflow is used which features a temperature-inducible deformation effect. Furthermore, means are provided for inciting the deformation effect, in order to achieve a desired setting of the airstream.

According to a preferred design of the invention the actuator is in the form of a flexible strip. When for instance a current is applied to the actuator the actuator gets hot and bends so that an air exit opening is unblocked more or less. Alternatively the deformation effect of the actuator is induced by heating the actuator with a controllable radiation source.

According to another preferred design of the invention the actuator is formed for the arching of an interior covering. For this purpose, several adjacent actuators are for inprovided which each featuring a deformation effect in the opposite direction. Through temperature induction of the de formation effect this results in the formation of air exit openings of varying size.

According to another preferred design of the invention the actuators are arranged on a meander-shaped support. The deformation effect causes a deformation of the support which consequently unblocks a air exit opening.

According to another preferred design of the invention the actuator is supported solidly one one side and detachably on an opposite side. The detachable support may for instance be realized with electromagnetic means.

According to another preferred design of the invention each actuator can be controlled separately, or groupd of actuators are formed with the individual groups being each separately controllable.

According to a preferred design of the invention a large-surface air exit area is realized in the area of the instrument panel, the headliner or another interior covering component. For this purpose several actuators are distributed over the air exit area.

According to another preferred design of the invention one or several actuators are provided in a vehicle seat for supplying the airstream through the seat surface.

For the realization of the temperature-inducible deformation effect of the actuator several suitable technologies may be applied. An actuator may for instance be realized by sandwiching materials of different thermal expansion coefficients; when different metallic materials are used, such an arrangement is called a bimetall strip.

According to a preferred design of the invention the temperature-inducible deformation effect is achieved by using materials with a shape-memory effect. Appropriate alloys are also called Shape-Memory-Alloys (SMA). Examples for this are the NiPi- and NiTiPb alloys. Additional shape-memory alloys are known from "Alloys with Shape-Memory", Dieter Stöckel, Erhard Hornbogen, Expert-Verlag, 1988, ISBN 3-8169-0323-1. Alternatively or additionally conductive synthetic materials as they are known in the field of polyelectronics may be used.

The deformation effect is a reversible effect. For this one may use a one-way effect with an additional mechanic readjusting device. This reversible effect is based on the fact that so-called memory-alloys are considerably less solid in the martensitic state than in the high-temperature phase. It is therefore by heating that the deformation of the actuator into the high-temperature form is achieved, for instance through the supply of an electrical current. After the current is switched off the actuator does not automatically resume its original shape, but it is returned ot its original shape by a force produced by appropriate mechanical means.

Alternatively, a material is used that features a two-way effect. With the two-way effect the material "remembers" both the high-temperature and a low-temperature form. As a special case of the two-way effect one may also use materials featuring an all-round effect.

Use of materials with shape-memory effect for automotive technology is as such known from "Alloys wwith shape-memory", chapter 3.8.2, page 92 to 94, and notably for fog lights with protective lamella against stones with a nickel-titanium spring as memory element and also for temperature-dependent actuating functions for engines, transmissions and chassis, as for instance for fan clutches of engines, throttling devices of injection pumps as well as for vehicle transmissions with enhanced shifting behavior. From patent CA 2346260A1 one is also familiar with the use of shape-memory alloys for the setting/adjusting of a rearview mirror.

SUMMARY OF THE INVENTION

The present invention allows the advantageous use of materials with shape-memory effects for realizing an air outlet for a vehicle. Through the use of materials with shape-memory it is possible to create a large-surface diffused flow field which vehicle occupants find to be especially pleasant.

According to a preferred version of the invention an appropriately large-surfaced air outlet is integrated into the instrument panel. Alternatively or additionally the air outlet may also be integrated into the headliner or another interior covering element. And it is also possible to integrate an air outlet according to invention into a vehicle seat.

In the following some preferred versions of the invention are explained in detail with reference being made to the drawing.

DETAILED DESCRIPTION OF THE EMBODIMENTS

Figure 1:
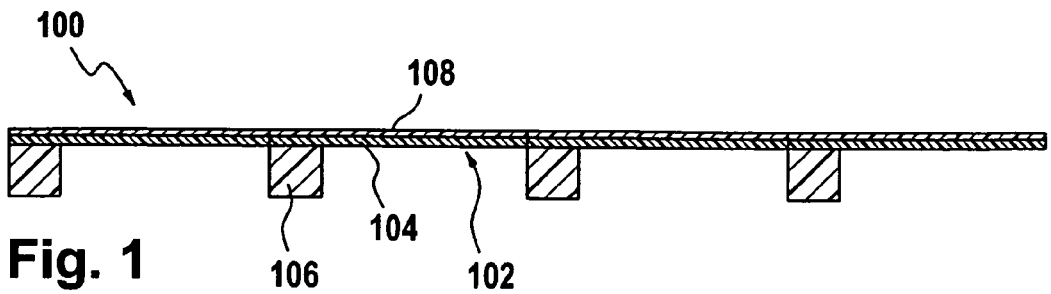
FIG. 1 a first version of an air outlet in its closed state.

FIG. 1 shows an interior covering element 100 of a vehicle. Integrated into the interior covering element 100 is an outlet which features several actuators 102. Each actuator 102 has a material layer 104 of a material with a temperature-inducible deformation effect.

The material is for instance a shape-memory alloy, i.e., a so-called Shape-Memory-Alloy (SMA). The material layer 104 is in the form of strips and fastened at its one end on the support 106.

On the surface of the material layer 104 is an additional layer 108. The layer 108 may be a decorative layer or it may be another functional layer. In the latter case the layer 108 may be of the same material as the layer 104, with the material in layer 108 being in a different phase, i.e. for instance in the material layer 104 in the austenitic phase and in the material layer 108 in the martensitic phase or vice versa.

FIG. 1 shows the condition of the interior covering element 100 in its closed state. In this state the actuators 102 are in their low temperature shape.

Figure 2:
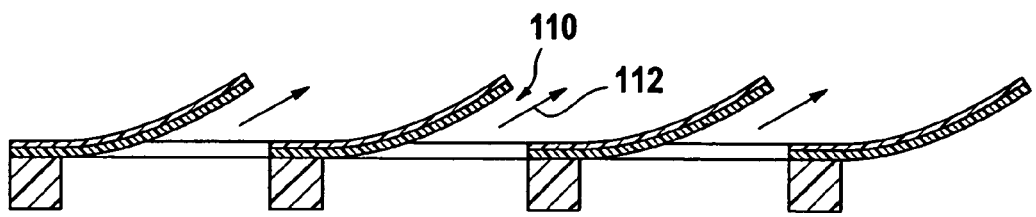
FIG. 2 the air outlet of FIG. 1 in the opened state,
FIG. 3 a second version of an air outlet in its closed state,
FIG. 4 the air outlet per FIG. 3 after driving it to direct the airstream into a first direction,
FIG. 5 the air outlet per FIG. 3 after driving it to direct the airstream into a second direction,
FIG. 6 a cross section of an air outlet in closed condition that is integrated into an interior covering element,
FIG. 7 the interior covering element of FIG. 6 in its opened condition,
FIG. 8 an interior covering element with a lamellar, parallel arrangement of actuators in the closed condition,
FIG. 9 the interior covering element of FIG. 8 in the opened condition,
FIG. 10 an interior covering element with a meander-shaped support in the closed condition,
FIG. 11 the interior covering element of FIG. 10 in the opened condition,
FIG. 12 a perspective view of an instrument panel with integrated large-surfaced outlet and
FIG. 13 the instrument panel of FIG. 12 with the outlet in the opened condition.

By applying a voltage or other induction of current into the material layer 104 the temperature is increased by several degrees Kelvin. Alternatively one may also use a radiation source below the actuators 102 to increase the temperature. The temperature change causes the actuators 102 to "remember" their high temperature shape and to transition to it, as shown in FIG. 2. Through the transition to the high temperature shape the actuators 102 unblock air exit openings 110 through which air 112 can stream from a fan into the passenger compartment.

When a Shape-Memory-alloys with two-way effect is used for the material layer 104, the actuator 102 resumes, after the current or the radiation source is shut off and due to the cooling caused thereby, its low-temperature shape shown in FIG. 1. By selecting the current or radiation intensity and thereby the associated temperature it is possible to regulate the bending of the actuators 102 and thereby the size of the air exit opening 110.

When using a Shape-Memory-Alloy with one-way effect the layer 108 may serve for the application of a mechanical restoring force to the material layer 104. After cooling of the material layer 104 this layer retransitions to the martensitic phase and is restored to its original position by the layer 108 above it, which has been elastically deformed by the high-temperature shape of the material layer 104.

Here is is particularly advantageous that the interior covering element 100 with integrated air outlet can be made from a small number of individual components and that the air outlet can be controlled by an electrical current for instance without requiring an otherwise usual servomotor.

These advantages come together with a lower weight. An additional particular advantage is that a large-surface air stream from the interior covering element 100 can be realized with little constructive expenditure.

Figure 3:
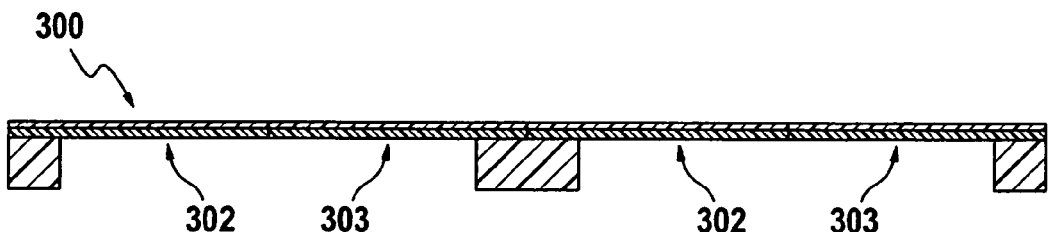

FIG. 3 shows an interior covering element 300. Similar to the interior covering element 100 of FIGS. 1 and 2 the interior covering element 300 of FIG. 3 does also have actuators 302. Furthermore the interior covering element 300 has actuators 303 which are built in mirror image to the actuators 302.

Figure 4:
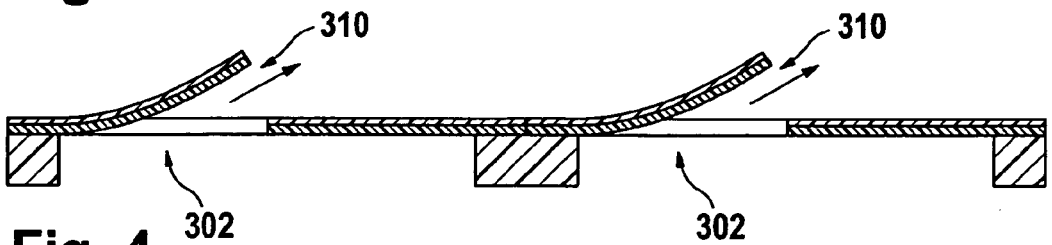

FIG. 3 shows the interior covering element 300 with closed actuators 302 and 303, when the actuators 302, 303 are in their low temperature form. If the temperature of only the actuators 302 is being increased, e.g. by applying a voltage or inducing a current or through external radiation, these actuators 302 assume their high temperature shape shown in FIG. 4. Thereby air exit openings 310 are unblocked, in order to direct the airstream of the fan for instance for de-icing of the windshield of the vehicle. The actuators 303 remain in their low temperature shape.

Figure 5:
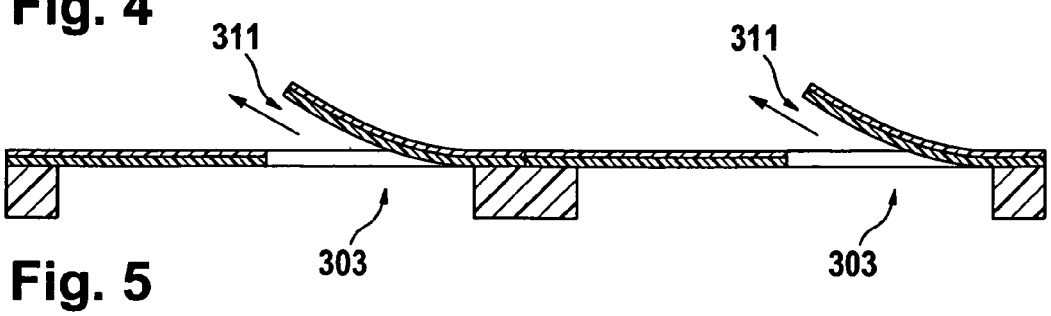

If, on the other hand, voltage for instance is applied only to actuators 303 so their temperature increases, the actuators 303 assume their high temperature shape as shown in FIG. 5. This unblocks air exit openings 311 in order to direct the fan air for instance into the direction of the vehicle occupants.

With the shape of actuators 102 of FIG. 1 or with the shape of actuators 302, 303 of FIG. 3 respectively, it may be the low temperature shape or also the high temperature shape. In this case an increased temperature must be present to achieve the clsoed condition of the interior covering element 100 or of the interior covering element 300 respectively. To realize air exit openings 110 or 310 or 311 respectively the voltage applied to each must be reduced appropriately or shut off, to let the desired actuators transition to the low temperature shape.

Figure 6:
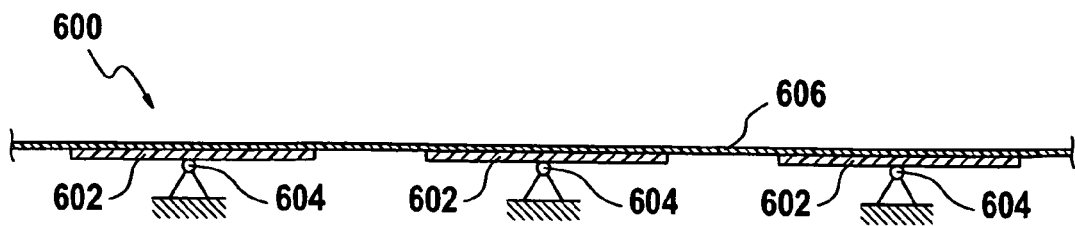

FIG. 6 shows an interior covering element 600 with several actuators 602 which are held in place by supports 604. The actuators 602 consists of a shape-memory alloy with a high temperature and a low temperature shape. The shape of the actuators 602 shown in FIG. 6 for instance is the low temperature shape.

The low temperature shape of actuators 602 is essentially level. The actuators 602 carry a decorative layer 606. This may be for instance a casting skin made of polyurethane or PVC, a so-called slush skin or a spray skin. Alternatively or additionally the decorative layer 606 may also feature a fabric layer. The decorative material visible from the outside of the decorative layer 606 may for instance be applied to a layer consisting of polypropylene foam.

Figure 7:
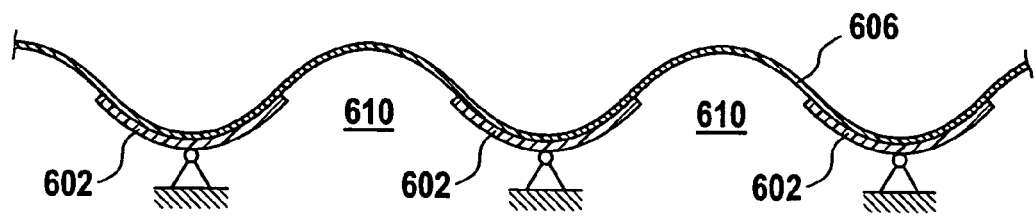

By applying a voltage to the actuators 602 a current is produced which heats the actuator 602 so that they assume their high temperature shape, as shown in FIG. 7. In their high temperature shape these actuators 602 are curved upwards. This deformation of actuators 602 changes the shape of the flexible decorative layer 606. This deformation unblocks air exit openings 610 through which air can stream into the passenger compartment in a diffuse manner.

Figure 8:
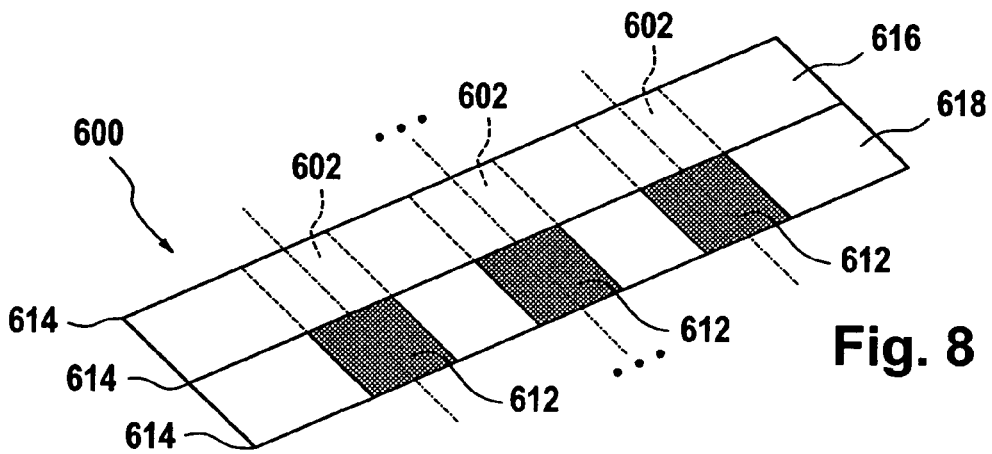

FIG. 8 show a perspective view of the interior covering element 600. The decorative layer 606 has incisions along the lines 614 resulting in several strips 616 and 618. As shown in FIGS. 6 and 7 the area of strip 616 is built up. In the area of strip 618 the actuators 612 located there undergo during increased temperature a deformation that is opposite in direction to the deformation of actuators 602, i.e., the actuators 612 are curved downward in their high temperature shape.

The interior covering element 600 may feature a multitude of lamella-like strips 616 and 618 arranged side by side with the strips 616 and 618 succeeding each other alternatingly. If no control signal is applied, all actuators 602 and 612 are in their low temperature shape thereby creating an essentially closed surface of the interior covering element 600.

Figure 9:
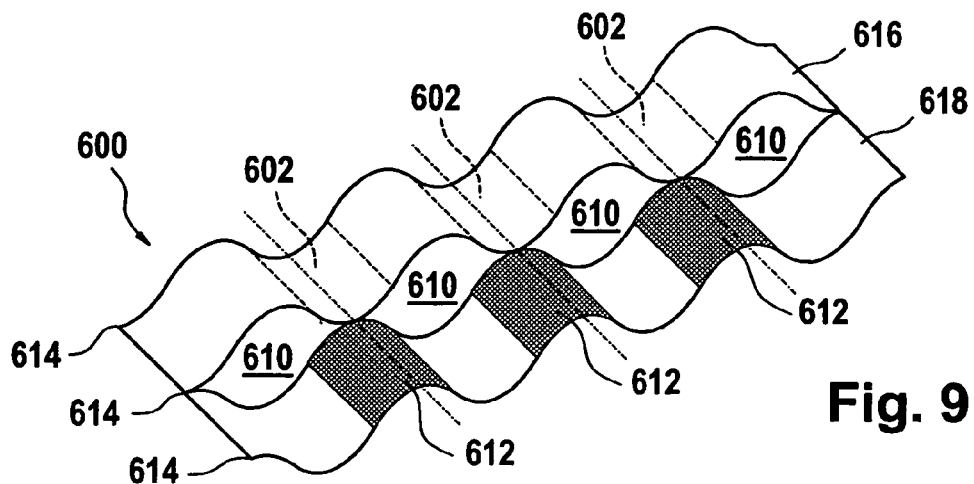

Through induction of the deformation effect the actuators 602 transition to their upward-bent high temperature shape while the actuators 612 transition to their downward-bent high temperature shape. This causes the creation, in the area of strips 616 and 618 convexity in opposite directions of the surface of the interior covering element 600. Where adjacent strips 616 and 618 border on each other, the opposing convexities serve to unblock the air exit openings 610 (compare to FIG. 9).

Figure 10:
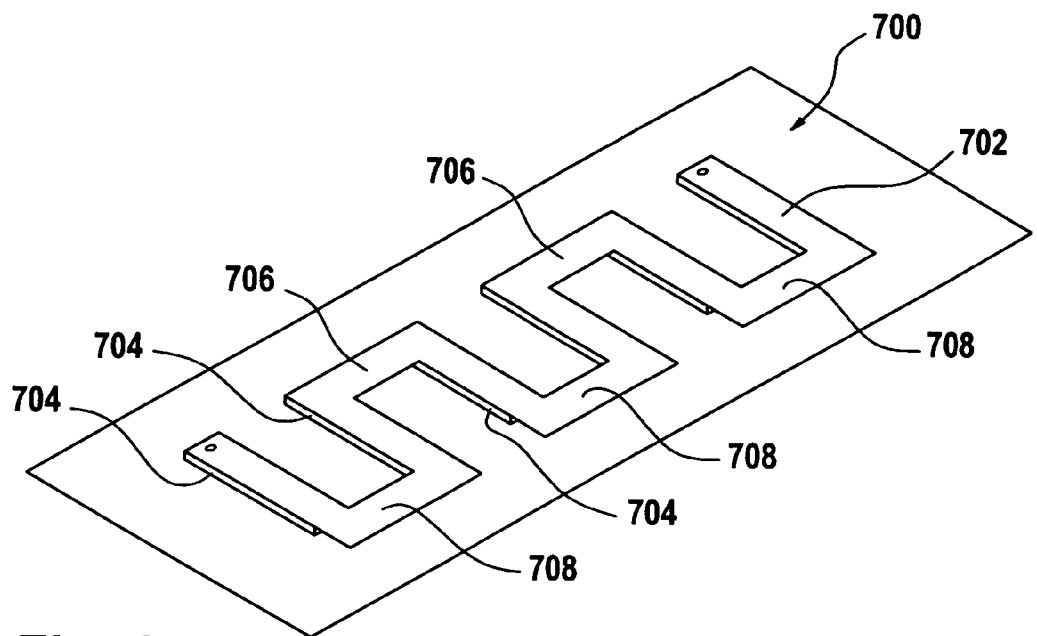

FIG. 10 shows an interior covering element 700 with a meander-shaped support 702 for actuators 704 made of a shape-memory alloy. Actuators 704 are each arranged on parallel opposing sections of the meander-shaped support 702. The intermediate sections 708 of the meander-shaped support 702 do not bear any actuators 704. The sections 706 of the meander-shaped support 702 are solidly connected to the interior covering element 700. Along the remaining sections of the meander-shaped support 702 there are incisions into the surface of the interior covering element 700.

Figure 11:
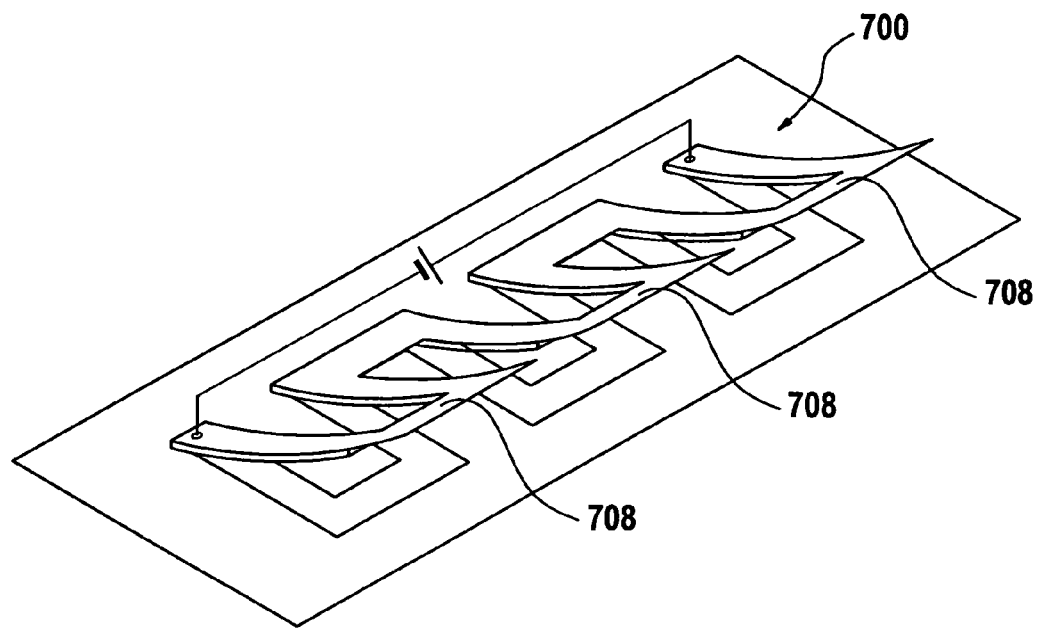

Through induction of the deformation effect the actuators 704 transition from their low temperature shape into their upward-bent high temperature shape, as shown in FIG. 11. This causes the actuators 704 and the sections 708 of the interior covering element 700 opposite the sections 706 to unblock air exit openings on the surface of the interior covering element 700.

Figure 12:
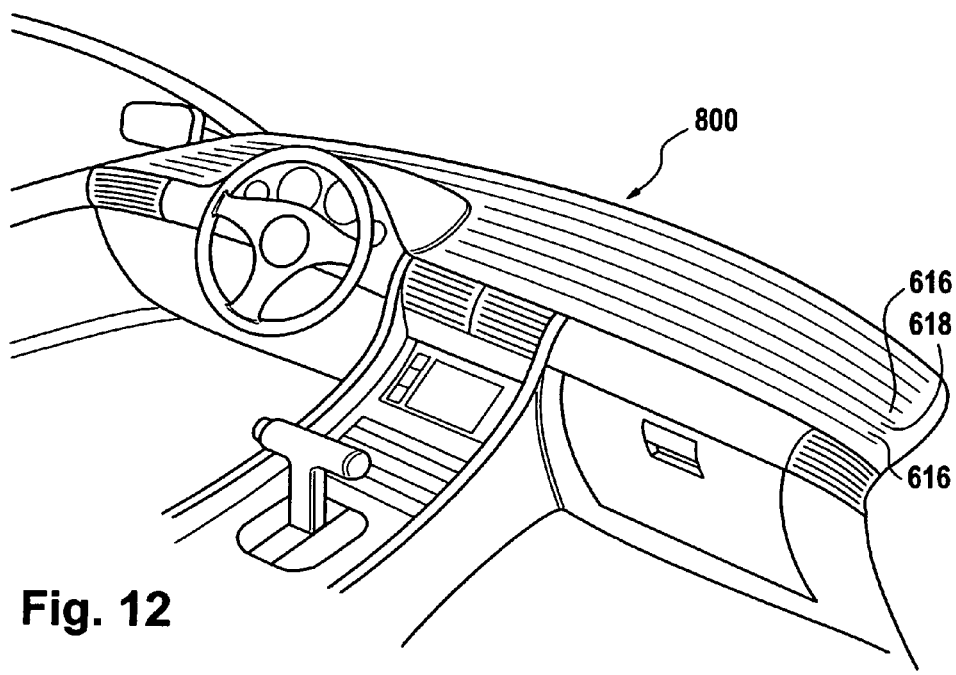

FIG. 12 shows an instrument panel 800 on the upper part of which strips 616, 618 are arranged in alternating sequence. On principle these are constructed as explained above with reference to FIGS. 6 to 9. Preferably the entire surface of the instrument panel 800 is essentially subdivided into strips 616 and 618.

Figure 13:
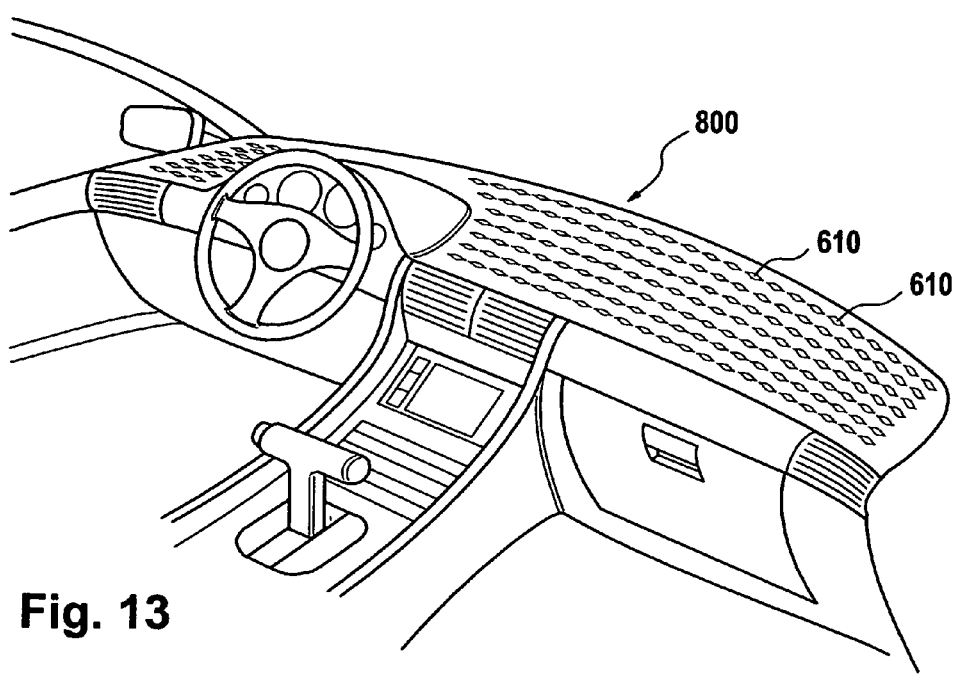

FIG. 12 shows the strips 616, 618 in closed condition so that an essentially smooth surface is created on the upper side of the instrument panel 800. By appropriate triggering of the actuators arranged on the strips 616, 618 the upper side of the instrument panel assumes an undulatory structure (compare FIG. 9). This creates a multitude of air exit openings 610 on the upper side of the instrument panel 800 as shown in FIG. 13. This results in a large-surface diffuse airstream field which the occupants find to be very pleasant.

Alternatively the upper side of the instrument panel 800 may be equipped with meander-shaped supports (compare meander-shaped supports 702 of FIGS. 10 and 11), in order to realize air exit openings by exploiting the shape-memory effect.

Instead of on the upper side of the instrument panel 800 it is possible in this manner to create large-surface outlets also in other vehicle parts for the creation of a diffused ventilation. For instance the headliner as well as side covering elements, seat covering elements and covering elements of the center console may be used for this purpose.

LIST OF REFERENCE MARKS

Interior covering element 100
Actuator 102
Material layer 104
Support 106
Layer 108
air exit opening 110
air 112
Interior covering element 300
Actuator 302
Actuators 303
air exit opening 310
air exit opening 311
Interior covering element 600
Actuator 602
Support 604
Decorative layer 606
Air exit opening 610
Stellelement 612
Linie 614
Streifen 616
Streifen 618
Innenverkleidungsteil 700
meander-shaped support 702
Stellelemente 704
Abschnitt 706
Instrumententafel 800

The invention claimed is:

1. Air outlet for a vehicle, comprising:
   an air exit surface having at least one air exit opening;
   an actuator for an air stream, wherein the actuator is part of the air exit surface, the actuator including a temperature-inducible deformation effect and operable for deforming a vehicle's interior covering into an arching surface, the actuator being adapted to block and to unblock the at least one air exit opening of the air outlet for the air stream in response to the temperature-inducible deformation effect; and
   means for triggering the deformation effect.

2. The air outlet per claim 1, wherein the actuator is designed as a bending strip.

3. The air outlet as per claim 1, wherein at least two adjacent actuators include the deformation effect in opposing directions.

4. The air outlet as per one claim 1, further comprising: a meander-shaped support for receiving a plurality of actuators.

5. The air outlet as per claim 1, further comprising: several actuators, where each actuator can be activated separately, or with groups of actuators, and where each group of actuators can be activated separately.

6. The air outlet as per claim 1, wherein the actuator is fixed solidly on one side and detachably on an opposite side.

7. The air outlet as per claim 1, wherein the air exit surface is adapted for diffuse air distribution in a passenger compartment of the vehicle, with several actuators being provided in the area of the air exit surface.

8. The air outlet as per claim 1, wherein the means for inciting the deformation effect is in the form of electrical means for heating the actuator through an electrical current.

9. The air outlet as per claim 1, wherein the means for inciting the deformation effect is in the form of a radiation device for heating the actuator by radiation.

10. The air outlet as per claim 1, wherein the deformation effect is a shape memory effect.

11. The air outlet as per claim 10, wherein the actuator includes a material made from a shape-memory alloy or from a conductive synthetic material.

12. The air outlet as per claim 10, wherein the shape memory effect is a one-way effect and includes means for mechanically resetting the actuator following induction of a one-way effect.

13. The air outlet as per claim 10, wherein the shape memory effect is a two-way effect.

14. The air outlet as per claim 10, wherein the shape-memory effect is an all-round-effect.

15. The air outlet as per claim 10, wherein the material of the shape-memory alloy is partially in the austenitic phase and partially in the martensitic phase.

16. An instrument panel, comprising:
   an air exit surface, having at least one air exit opening, for diffuse air distribution including a plurality of actuators for the at least one air exit opening, wherein the actuators are distributed over the air exit surface, and the actuators include a temperature-inducible deformation effect in which the actuators are operable for deforming a vehicle's interior covering into an arching surface and are responsive to block and to unblock the air exit surface; and
   means to trigger the deformation effect.

17. A headliner, comprising:
   an air exit surface, having at least one air exit opening, for diffuse air distribution including a plurality of actuators for the at least one air exit opening, wherein the actuators are distributed over the air exit surface, and the actuators include a temperature-inducible deformation effect in which the actuators are operable for deforming a vehicle's interior covering into an arching surface and are responsive to block and to unblock the air exit surface; and
   means to trigger the deformation effect.

18. An interior covering element, comprising:
   an air exit surface, having at least one air exit opening, for diffuse air distribution including a plurality of actuators for the at least one air exit opening, wherein the actuators are distributed over the air exit surface, and the actuators include a temperature-inducible deformation effect in which the actuators are operable for deforming a vehicle's interior covering into an arching surface and are responsive to block and to unblock the air exit surface; and
   means to trigger the deformation effect.

19. A vehicle seat, comprising:
   an integrated fan or fan connection;
   an air exit surface, having at least one air exit opening, for diffuse air distribution;
   at least one actuator, for the at least one air exit opening, within the vehicle seat for an air stream, wherein the actuator includes a temperature-inducible deformation effect in which the at least one actuator is operable for deforming a vehicle's interior covering into an arching surface and responsive to block and to unblock the air exit surface; and
   means to trigger the deformation effect.

* * * * *